US009900135B2

United States Patent
Lee et al.

(10) Patent No.: US 9,900,135 B2
(45) Date of Patent: Feb. 20, 2018

(54) ANTENNA COMBINING FOR MASSIVE MIMO SCHEME

(71) Applicant: LG ELECTRONICS INC., Seoul (KR)

(72) Inventors: Kilbom Lee, Seoul (KR); Jiwon Kang, Seoul (KR); Hyunsoo Ko, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 14/910,065

(22) PCT Filed: Feb. 21, 2014

(86) PCT No.: PCT/KR2014/001439
§ 371 (c)(1),
(2) Date: Feb. 4, 2016

(87) PCT Pub. No.: WO2015/020291
PCT Pub. Date: Feb. 12, 2015

(65) Prior Publication Data
US 2016/0173252 A1  Jun. 16, 2016

Related U.S. Application Data

(60) Provisional application No. 61/863,919, filed on Aug. 9, 2013.

(51) Int. Cl.
*H04L 5/00* (2006.01)
*H04B 7/26* (2006.01)
(Continued)

(52) U.S. Cl.
CPC ........... *H04L 5/0048* (2013.01); *H04B 7/024* (2013.01); *H04B 7/0404* (2013.01);
(Continued)

(58) Field of Classification Search
None
See application file for complete search history.

(56) References Cited

U.S. PATENT DOCUMENTS

| 2010/0246638 | A1 | 9/2010 | Mehta et al. | |
| 2011/0249637 | A1* | 10/2011 | Hammarwall | H04B 7/0634 370/329 |

(Continued)

FOREIGN PATENT DOCUMENTS

| EP | 2346190 | 7/2011 |
| WO | 2011/138979 | 11/2011 |

OTHER PUBLICATIONS

PCT International Application No. PCT/KR2014/001439, Written Opinion of the International Sarching Authority dated Jun. 20, 2014, 8 pages.

*Primary Examiner* — Charles C Jiang
*Assistant Examiner* — Rose Clark
(74) *Attorney, Agent, or Firm* — Lee Hong Degerman Kang & Waimey

(57) ABSTRACT

The base station, receiving first pilot signals transmitted via each of multiple antennas of a user equipment (UE), selects one or more reference codebooks based on channel qualities of the received first pilot signals, and selects one or more sub-channels for each of the reference codebooks. Based on this, the base station determines one or more virtual channels, wherein each of the virtual channels comprises one reference codebook and the one or more sub channels selected for the one reference codebook, wherein the sub-channels are selected to minimum distance between corresponding virtual channel and corresponding reference codebook. And, the base station transmits antenna combining information to the UE, wherein the antenna combining information combines the multiple antennas of the UE into one or more antenna groups corresponding to the one or (Continued)

more virtual channels; and receive second pilot signals transmitted by the UE based on the antenna combining information.

7 Claims, 12 Drawing Sheets

(51) Int. Cl.
*H04B 7/0417* (2017.01)
*H04B 7/0452* (2017.01)
*H04B 7/06* (2006.01)
*H04B 7/024* (2017.01)
*H04B 7/04* (2017.01)
*H04B 7/0404* (2017.01)
*H04B 7/08* (2006.01)

(52) U.S. Cl.
CPC ......... *H04B 7/0417* (2013.01); *H04B 7/0452* (2013.01); *H04B 7/0482* (2013.01); *H04B 7/0691* (2013.01); *H04B 7/0874* (2013.01); *H04B 7/26* (2013.01)

(56) References Cited

U.S. PATENT DOCUMENTS

| | | | |
|---|---|---|---|
| 2011/0267972 A1 | 11/2011 | Yoon et al. | |
| 2013/0182594 A1* | 7/2013 | Kim | H04W 72/042 370/252 |
| 2013/0287132 A1* | 10/2013 | Taoka | H04B 7/0452 375/267 |
| 2014/0112168 A1* | 4/2014 | Chen | H04L 5/0051 370/252 |
| 2015/0030092 A1* | 1/2015 | Krishnamurthy | H04B 7/0456 375/267 |

* cited by examiner

FIG. 3
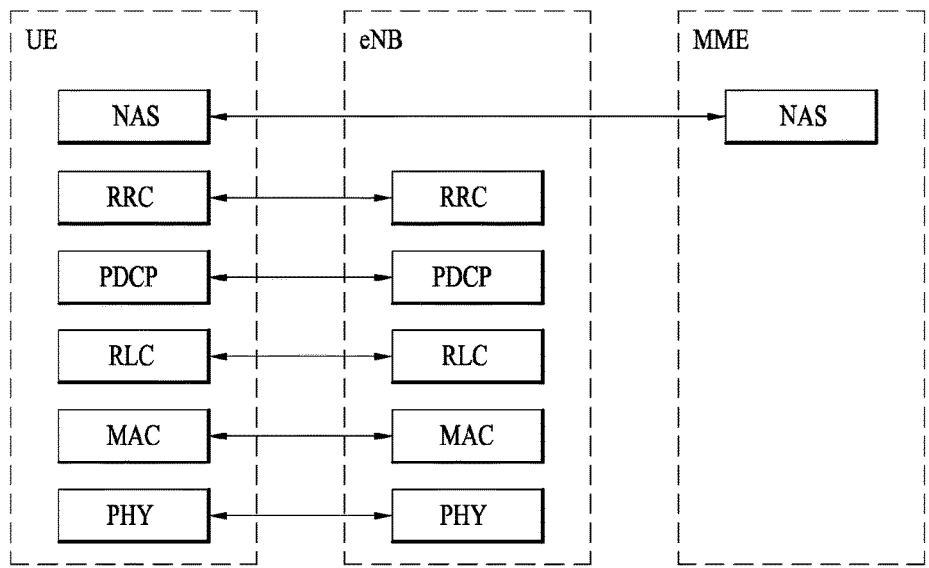
(a) contol - plane protocol stack
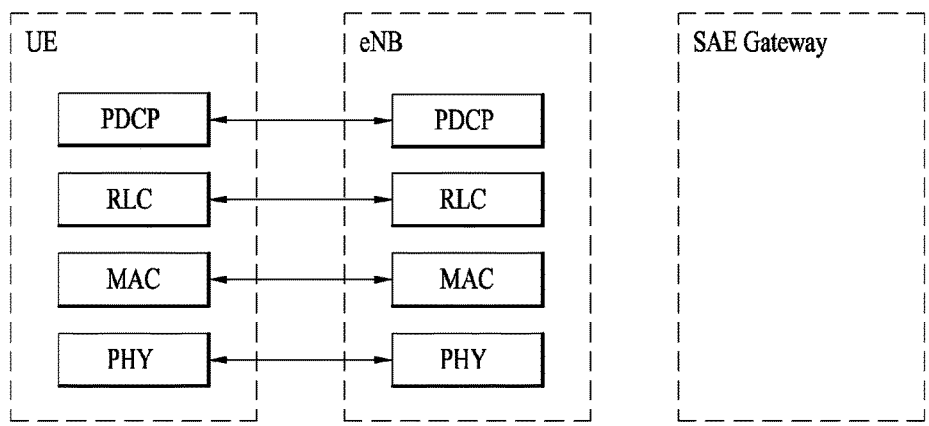
(b) user - plane protocol stack

ANTENNA COMBINING FOR MASSIVE MIMO SCHEME

CROSS-REFERENCE TO RELATED APPLICATIONS

This application is the National Stage filing under 35 U.S.C. 371 of International Application No. PCT/KR2014/001439, filed on Feb. 21, 2014, which claims the benefit of U.S. Provisional Application No. 61/863,919, filed on Aug. 9, 2013, the contents of which are all hereby incorporated by reference herein in their entirety.

TECHNICAL FIELD

The present invention relates to a wireless communication system, and more particularly, to methods for antenna combining to meet the pilot requirement of the massive MIMO system, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for antenna combining for the massive MIMO system, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a base station to operate in a wireless communication system employing a massive MIMO (Multiple Input Multiple Output) scheme is provided. The method comprises: receiving first pilot signals transmitted via each of multiple antennas of a user equipment (UE); selecting one or more reference codebooks based on channel qualities of the received first pilot signals; selecting one or more sub-channels for each of the reference codebooks; determining one or more virtual channels, wherein each of the virtual channels comprises one reference codebook among the one or more reference codebooks and the one or more sub channels selected for the one reference codebook, wherein the sub-channels are selected to minimum distance between corresponding virtual channel and corresponding reference codebook; transmitting antenna combining information to the UE, wherein the antenna combining information combines the multiple antennas of the UE into one or more antenna groups corresponding to the one or more virtual channels; and receiving second pilot signals transmitted by the UE based on the antenna combining information.

In another aspect of the present invention, a base station operating in a wireless communication system employing a massive MIMO (Multiple Input Multiple Output) scheme is provided. The base station comprises: multiple antennas; a transceiver configured to transmit and receive signals via the multiple antennas; and a processor being connected to and controlling the transceiver, wherein the processor is configured to receive first pilot signals transmitted via each of multiple antennas of a user equipment (UE); determine one or more reference codebooks based on channel qualities of the received first pilot signals; select one or more sub-channels for each of the reference channels; determine one or more virtual channels, wherein each of the virtual channels comprises one reference codebook among the one or more reference codebooks and the one or more sub channels selected for the one reference codebook, wherein the sub-channels are selected to minimum distance between corresponding virtual channel and corresponding reference codebook; transmit antenna combining information to the UE, wherein the antenna combining information combines the multiple antennas of the UE into one or more antenna groups corresponding to the one or more virtual channels; and receive second pilot signals transmitted by the UE based on the antenna combining information.

Here, each of orthogonal sequences for pilot signals may be allocated to each of the antenna groups, and the second pilot signals can be generated by using the allocated orthogonal sequences for each of the antenna groups.

The above selecting the one or more reference codebooks may comprise: selecting one or more reference channels based on reception power of each channel from each of the multiple antennas; and selecting each of the reference codebooks as closest to each of the reference channels.

Preferably, the method may further comprises: estimating distance between virtual channels based on the received second pilot signals; and transmitting a request message to the UE requesting to retransmit the first pilot signals when the correlation value becomes larger than a threshold value.

Preferably, the method may further comprise: transmitting modified antenna combining information to the UE determined based on the retransmitted first pilot signals.

Preferably, the method may further comprise: estimating downlink channel from the base station to the UE based on the received second pilot signals.

The UE may be within a first UE group, and the base station may receive the second pilot signals from the UE at different time period other than a time period where the base station receives the second pilot signals from a UE of a second UE group.

The base station may comprise multiple antennas, wherein a number of multiple antennas is greater than a threshold number.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3GPP radio access network standard.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a time division duplex (TDD) scheme in the present specification, the embodiments of the present invention may be easily modified and applied to a half-duplex FDD (H-FDD) scheme or a frequency division duplex (FDD) scheme.

Figure 1:
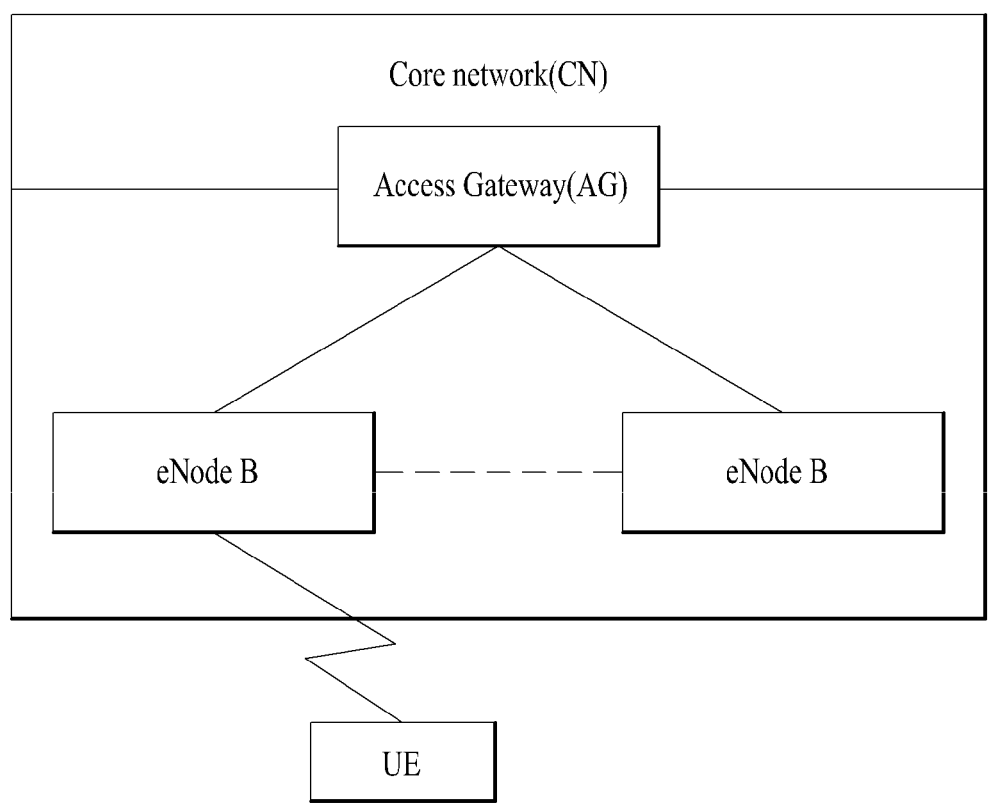
FIG. 1 is a diagram showing a network structure of an Evolved Universal Mobile Telecommunications System (E-UMTS) as an example of a wireless communication system.
Figure 2:
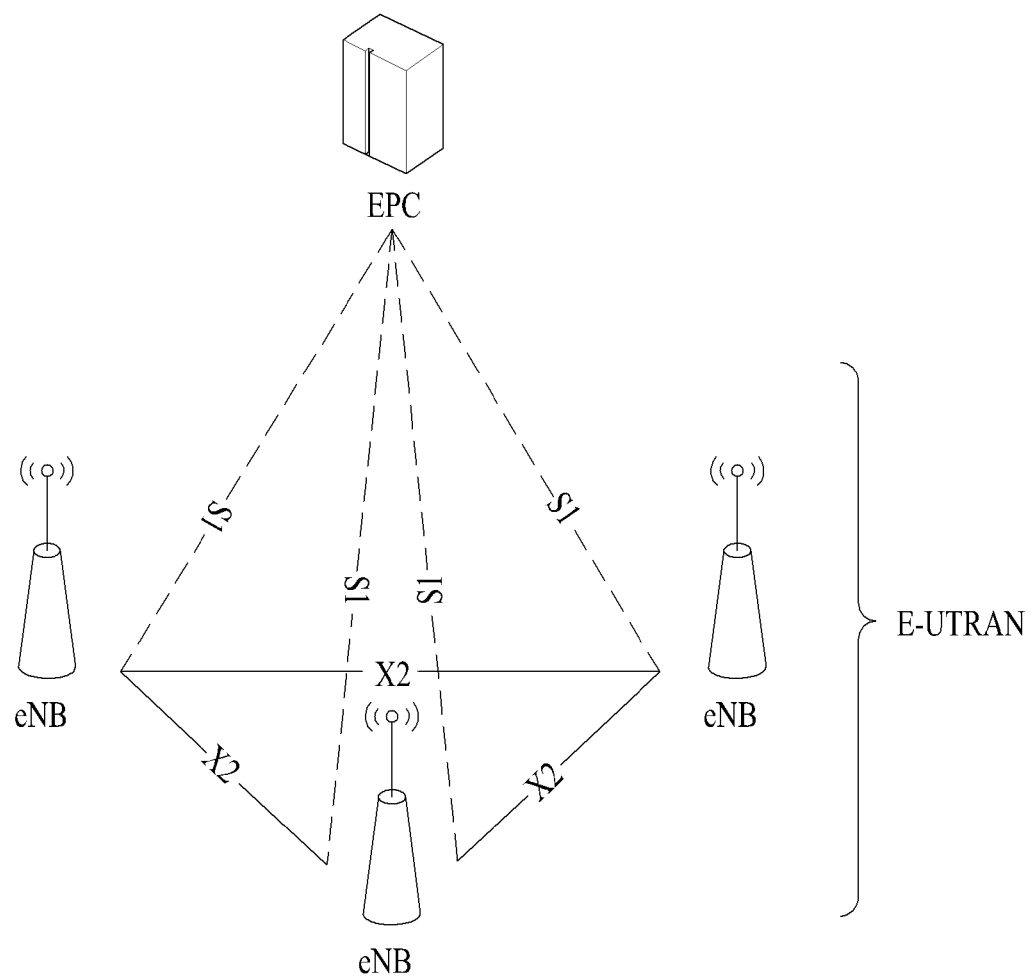
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
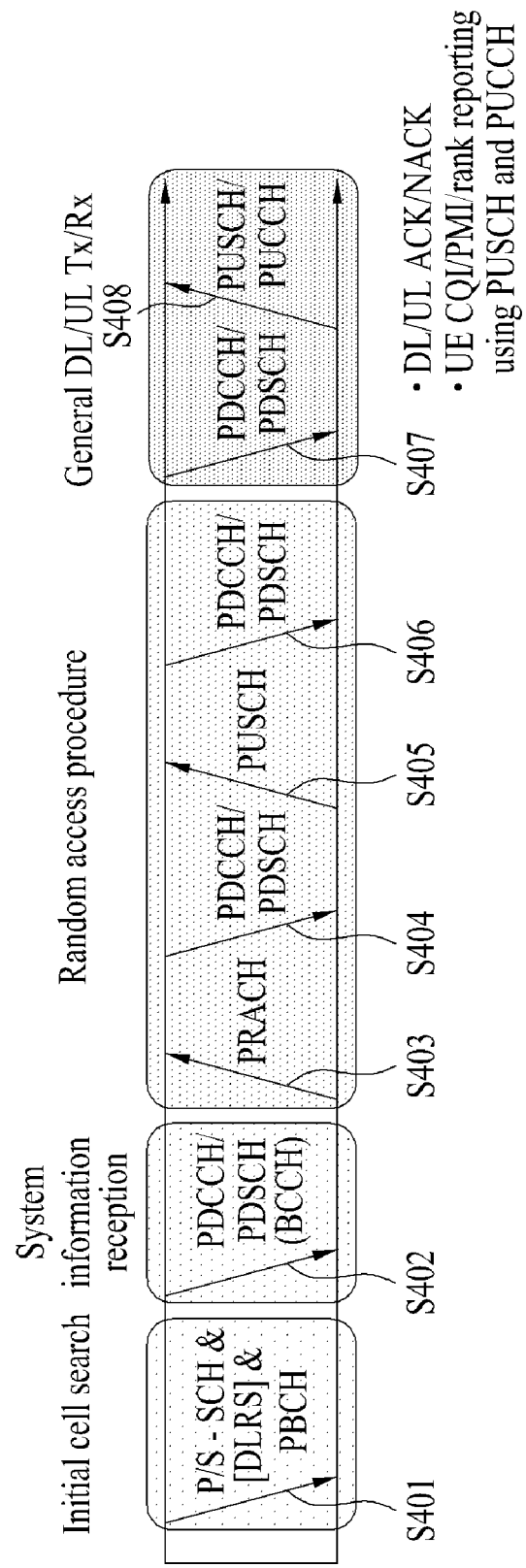
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
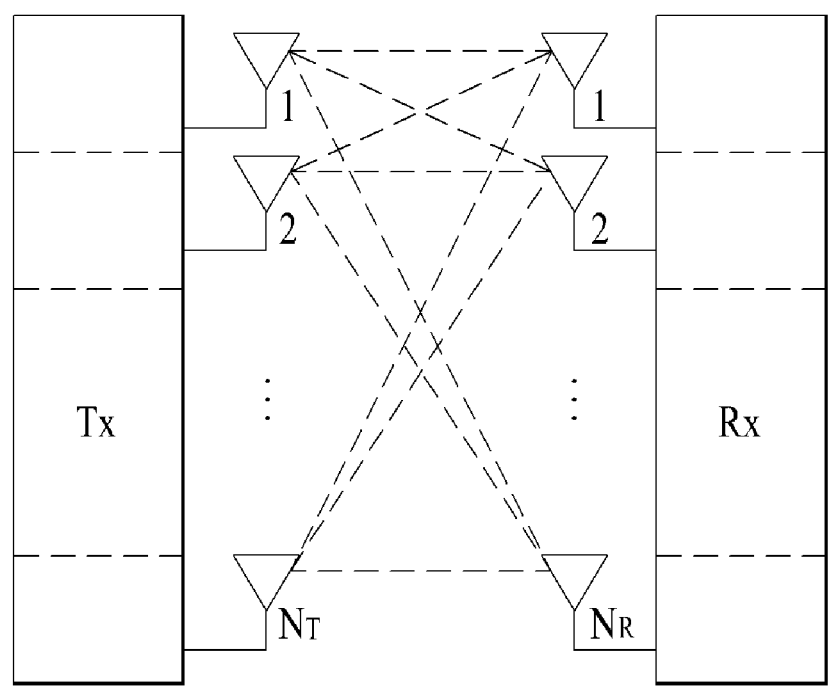
FIG. 5 is a diagram for a configuration of a general multi-antenna (MIMO) communication system.

FIG. 5 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in equation 1. In this case, $R_i$ is a smaller one of $N_T$ and $N_R$.

$$R_i = \min(N_T, N_R) \quad \text{[Equation 1]}$$

For instance, in an MIMO communication system, which uses 4 transmitting antennas and 4 receiving antennas, it may be able to obtain a transmission rate 4 times higher than that of a single antenna system.

The above explained MIMO system assumes that the transmitter in a wireless communication system knows the channel. For some transmission schemes (e.g. STC, alamouti method), there is no need to know the channel, but it cannot be generalized. Thus, there is need for channel estimation for MIMO, so the receiver/transmitter may transmit reference signals (RSs) for this purpose.

For channel estimation without interference, the RSs of multiple transmitters should be orthogonal to each other. If there is a correlation between the RS from the first transmitter to the first receiver and the RS from the second transmitter to the second receiver, the channel estimation at the first receiver may reflect not only the channel from the first transmitter to the first receiver but also the channel from the second transmitter to the first receiver. It can be said that the channel from the first transmitter to the first receiver is contaminated by the channel from the second transmitter to the first receiver. And, this can be also said as 'pilot contamination'.

The above explained pilot contamination may limits the link performance due to the error caused by this contamination, so even when the transmitter raise the transmission power, the link performance cannot be improved above a certain limit. So, the reference signals transmitted at certain timing should be orthogonal to each other.

Based on this, the concept of massive MIMO system of the present application will be explained.

Recently, the massive MIMO scheme got lots of attention as a candidate constituent technology for 5G mobile communication system. This massive MIMO scheme can be employed to the system including a base station having multiple antennas and UEs having one antenna. Even though each UE has only one antenna, the entire system can be viewed as MIMO system when multiple UEs served by the base station having multiple antennas. If we assume that the number of UEs is K, the gradation of capacity in high SNR may be expressed as $\min(N_t, K)$.

The number of antennas for the base station can be unlimited. But, practically, we can suppose that the number of antennas of a base station exceed a certain threshold number, in order to distinguish the massive MIMO scheme from the conventional MIMO scheme. This threshold value can be 4 or 8, for example, but we suppose the case when the number of antenna for one base station is much more than this exemplary threshold number.

Theoretically, when the number of antennas for one base station goes to infinite, the optimal transmission algorithm of the base station may be MRT (maximal ration transmission), and optimal reception algorithm may be MRC (maximal ration combining). These MRT and MRC are simple, but the performance of these schemes is limited when the conventional MIMO scheme is used, because these schemes do not consider the interference. However, when the number of antennas for one base station goes to infinite, the above drawback is addressed. Also, if the number of antennas increases, the beam from one antenna can be sharp, so the signal from that antenna can be carried to the received without giving interference to other receivers.

On the other hand, in order to efficiently employ the above mentioned massive MIMO scheme, the preferred embodiment of the present application assumes the use of TDD (Time Division Duplex) instead of FDD (Frequency Division Duplex).

Figure 6:
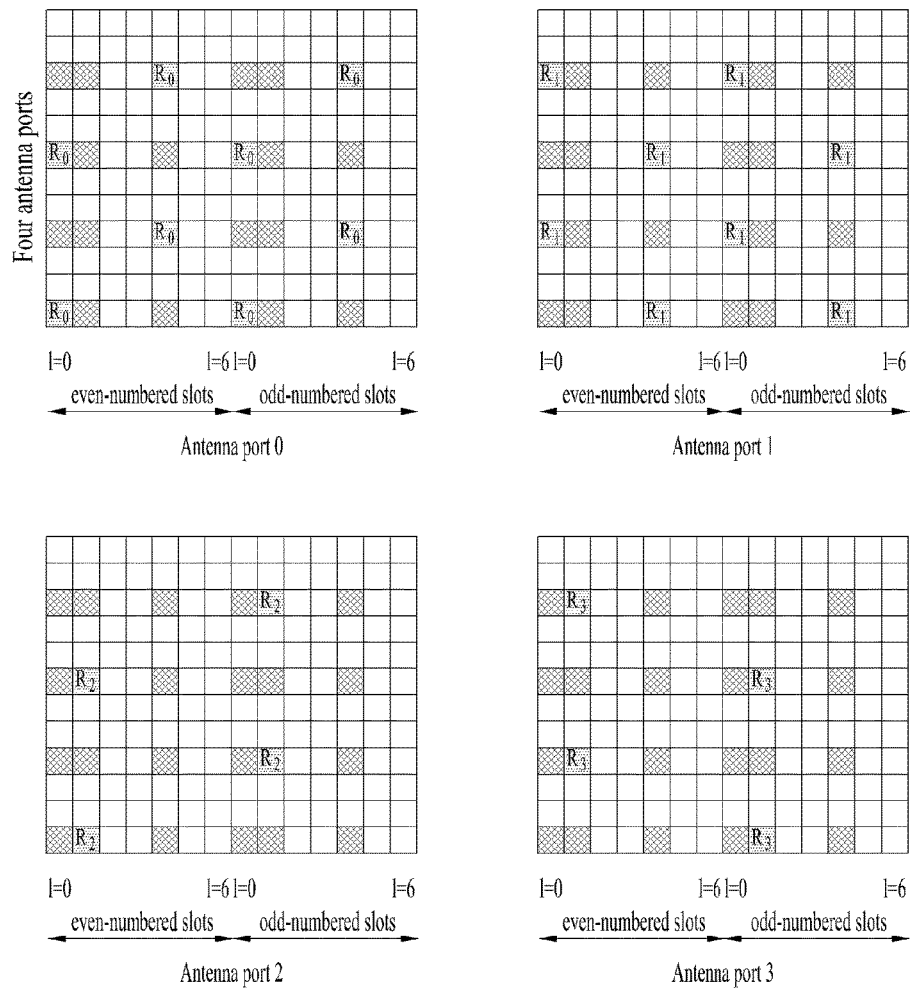
FIG. 6 shows a case when the base station having 4 antennas transmits cell-specific reference signal for channel estimation.

FIG. 6 shows a case when the base station having 4 antennas transmits cell-specific reference signal for channel estimation.

In order to perform downlink channel estimation in a wireless communication system employing FDD scheme, the base station shall transmits reference signals through each of the multiple antennas, and the UE shall feedback the channel status for each of the channels from each of antennas. FIG. 6 is for the case when the base station having 4 antennas transmits reference signals ($R_0$, $R_1$, $R_2$ and $R_3$) to each of the antenna ports 0, 1, 2 and 3. As can be seen from FIG. 6, the reference signals for different antennas take different resource elements in the time-frequency resource. Thus, when the number of antennas severely increases, the reference signal overhead shall severely increases.

Figure 7:
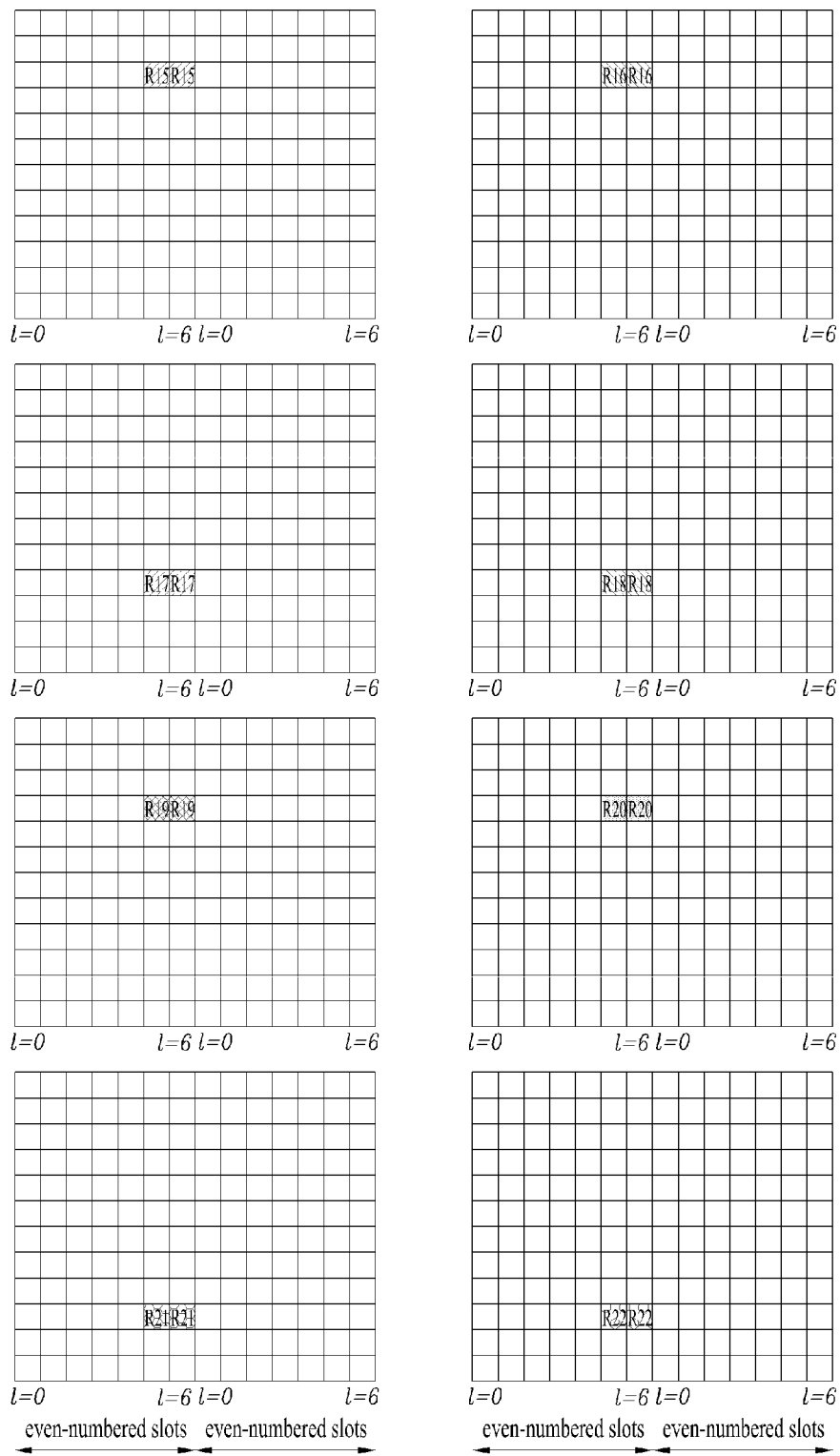
FIG. 7 shows a case when the base station having 8 antennas transmits CSI-RS for channel estimation.

FIG. 7 shows a case when the base station having 8 antennas transmits CSI-RS for channel estimation.

CSI-RS (Channel Status Information Reference Signal) is introduced to reduce the reference signal overhead. As can be seen from FIG. 7, the base station having 8 transmission antennas (antenna ports 15-22) may transmits the CSI-RSs via each of the antennas with reduced amount of resource when compared to the use of cell specific reference signal as shown by FIG. 6. Thus, one possible example of the present invention may use CSI-RS to estimate downlink channel, when the above explained massive MIMO is employed. However, in a preferred embodiment of the present application, the TDD scheme is employed and the uplink reference signal can be used to estimate downlink channel.

Figure 8:
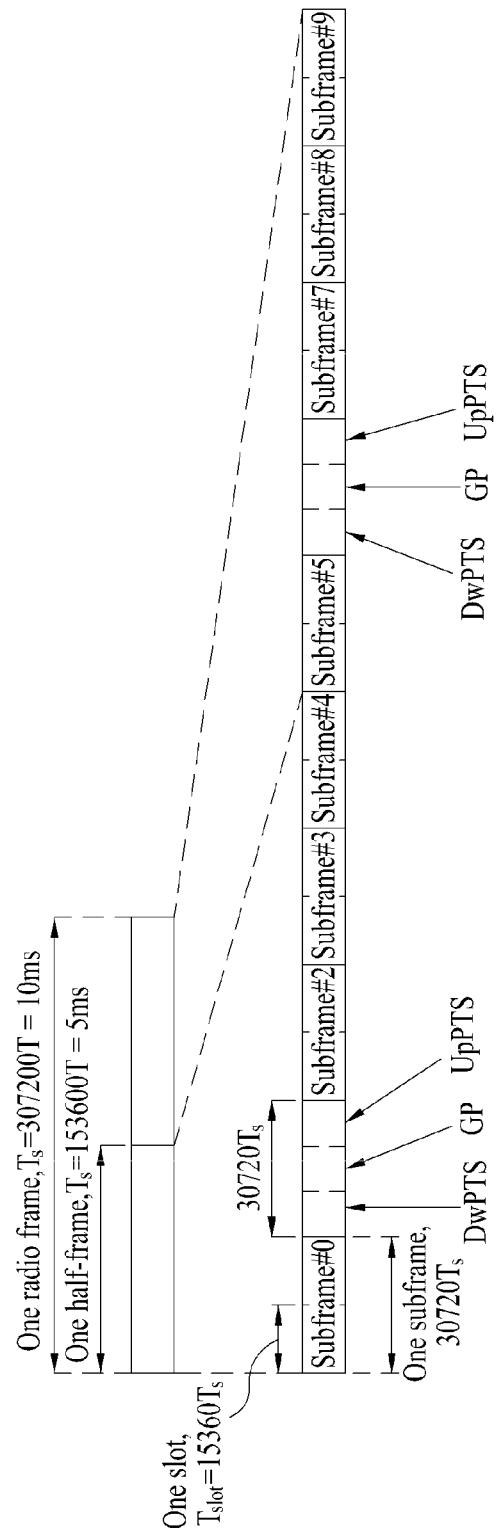
FIG. 8 shows a frame structure in a wireless communication system employing TDD scheme.

FIG. 8 shows a frame structure in a wireless communication system employing TDD scheme.

When FDD scheme is used, the downlink frequency band is different from the uplink frequency band. Thus, the estimation of the downlink channel is completely different from the estimation of the uplink channel. However, when the TDD scheme is used, the frequency band of the downlink channel is the same as that of uplink channel, thus we can use the uplink reference signal to estimate the downlink channel.

FIG. 8 is an example of the frame structure of one preferred embodiment of the present invention employing TDD scheme. Each radio frame of length $T_f=307200 \cdot T_s=10$ ms consists of two half-frames of length $153600 \cdot T_s=5$ ms each. Each half-frame consists of five subframes of length $30720 \cdot T_s=1$ ms. The supported uplink-downlink configurations are listed in [Table 1] where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by [Table 2] subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames.

In case of 10 ms downlink-to-uplink switch-point periodicity, the special subframe exists in the first half-frame only.

Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least 1456·$T_s$.

In case multiple cells with different uplink-downlink configurations are aggregated and the UE is not capable of simultaneous reception and transmission in the aggregated cells, the following constraints apply:
- if the subframe in the primary cell is a downlink subframe, the UE shall not transmit any signal or channel on a secondary cell in the same subframe
- if the subframe in the primary cell is an uplink subframe, the UE is not expected to receive any downlink transmissions on a secondary cell in the same subframe
- if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

By using the above explained frame structure for TDD scheme, the present embodiment may use the uplink reference signal to estimate the downlink channel. Further, the number of RSs does not have to increase when the number of antennas for one base station increase, and there is no need for the UEs to feedback the channel status information to the base station.

However, when the wireless communication system expends to multi-cell, the number of UEs shall increase, thus the number of orthogonal sequences for the uplink reference signals should increase to support it. But, there is a limit on the number of orthogonal sequences, thus when the number of orthogonal sequences is fewer than the number of UEs, there still may be the above explained pilot contamination problem.

To address this problem, one preferred embodiment of the present invention assumed UE grouping based reference signal transmission as explained below.

Figure 9:
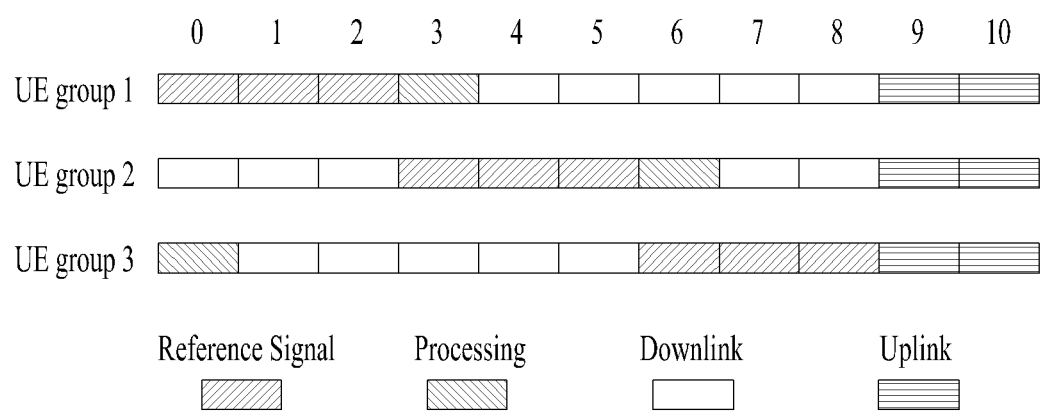
FIG. 9 shows UE grouping based reference signal transmission scheme according to one embodiment of the present invention.

FIG. 9 shows UE grouping based reference signal transmission scheme according to one embodiment of the present invention.

In this embodiment, the UEs in the wireless communication system may be grouped into multiple UE groups (e.g. UE group 1, UE group 2 and UE group 3 as shown in FIG. 9). UEs within the same UE group use orthogonal sequences for uplink reference signal orthogonal to each other. So, there is no pilot contamination problem for channel estimation.

Each UE group is synchronized with the base station with different timing. And, UEs of different UE groups may transmit uplink reference signals at different uplink transmission time units. For example, UE 1 of UE group 1 may transmits uplink sounding reference signal at subframes 0, 1 and 2 while UE 2 of UE group 2 receives downlink signal from the base station. The time units of FIG. 9 can be slot, subframe or equivalents. When the RS from UE 1 of UE group 1 is received by the base station, the base station may process it at subframe 4 while UE 2 of UE group 2 transmits uplink reference signals. When all the UE groups served by the base station (or base stations for Multi-BS operation) are synchronized with the base station(s), the UEs may transmits uplink data (e.g. from subframe 9 at FIG. 9).

The advantage of the above mentioned scheme will be explained.

Suppose there are two cells 'A' and 'B', and two UEs 'a' and 'b' within cells A and B, respectively. The channel $h_{mn}$ represents the channel between the $m^{th}$ base station and $n^{th}$ UE. The noise is not considered for convenience of explanation. In this case, when the base station A estimate the channel when the UEs a and b transmits SRS (sounding reference signal), the estimated channel can be expressed as $\hat{h}_{Aa} = \alpha_1 h_{Aa} + \alpha_2 h_{Ab} = \alpha_1 h_{Aa} + \alpha_2 h_{Ab}$. Here, $\alpha_1$ and $\alpha_2$ represent constant values. It can be said that the above estimated channel is contaminated by $\alpha_2 h_{Ab}$.

If the base station A receives data from UE a and UE b sending $\{d_a, d_b\}$, the result of MRC filter may be expressed as:

$$\frac{1}{N_t}\hat{h}_{Aa}^H(d_a h_{Aa} + d_b h_{Ab}) = \qquad \text{[Equation 2]}$$

-continued $$\frac{1}{N_t}(\alpha_1 h_{Aa}^H + \alpha_2 h_{Ab}^H)(d_a h_{Aa} + d_b h_{Ab}) =$$

$$\frac{\alpha_1 d_a}{N_t}\|h_{Aa}\|^2 + \frac{\alpha_2 d_b}{N_t}\|h_{Ab}\|^2 + \frac{\alpha_1 d_b}{N_t}h_{Aa}^H h_{ab} +$$

$$\frac{\alpha_2 d_a}{N_t}h_{Ab}^H h_{Aa} \xrightarrow[N_t \to \infty]{} \frac{\alpha_1 d_a}{N_t}\|h_{Aa}\|^2 + \frac{\alpha_2 d_b}{N_t}\|h_{Ab}\|^2$$

In the above [equation 2], it can be recognized that the term $$\frac{\alpha_2 d_b}{N_t}\|h_{Ab}\|^2$$

does not arrive to 0 even when the number of antennas becomes infinite. So, there will be a performance degradation due to the pilot contamination.

However, when the above explained UE grouping based scheme is used, only one UE (e.g. UE a) transmit SRS while the other UE (e.g. UE b) does not transmit SRS. Suppose that the UE b receives data from the base station B while the UE a transmits SRS. In this case, the channel estimation at base station A can be expressed as:

$$\hat{h}_{Aa} = \alpha_1 h_{Aa} + \alpha_2 h_{AB}$$  [Equation 3]

It should be noted that the term $h_{Ab}$ is replaced by $h_{AB}$, since the base station B transmits data when the UE a transmits reference signal. If the base station A receives data from UE a and UE b sending $\{d_a, d_b\}$, the result of MRC filter may be expressed as:

$$\frac{1}{N_t}\hat{h}_{Aa}^H(d_a h_{Aa} + d_b h_{Ab}) =$$  [Equation 4]

$$\frac{1}{N_t}(\alpha_1 h_{Aa}^H + \alpha_2 h_{AB}^H)(d_a h_{Aa} + d_b h_{Ab}) =$$

$$\frac{\alpha_1 d_a}{N_t}\|h_{Aa}\|^2 + \frac{\alpha_2 d_a}{N_t}h_{AB}^H h_{Aa} + \frac{\alpha_1 d_b}{N_t}h_{Aa}^H h_{Ab} +$$

$$\frac{\alpha_2 d_b}{N_t}h_{AB}^H h_{Ab} \xrightarrow[N_t \to \infty]{} \frac{\alpha_1 d_a}{N_t}\|h_{Aa}\|^2$$

It should be noted that the interference become 0 when the number of antenna become infinite. So, by using the UE grouping based RS transmission scheme, the pilot contamination problem can be addressed while the number of orthogonal sequences is limited.

The above mentioned UE grouping based RS scheme can be more improved by the following scheme.

When the UEs within the same UE group transmit orthogonal sequences orthogonal to each other, the base station can easily distinguish each channel from each other. But, when the number of orthogonal sequences is limited, the UEs within one UE group may not be allocated orthogonal sequences. In this case, the base station cannot distinguish the channels from each other.

The above problem becomes more serious when the UE has multiple antennas. Suppose there are N orthogonal sequences and each UE has Nr antennas. In this case, UE can transmit/receive Nr independent signals at the same time. And, the network can support only N/Nr UEs within one UE group.

In the same example, when the network allocates only Nr/2 sequences to each UE, the network can support 2N/Nr UEs within one UE group. This can be a tradeoff between the number of data the UE can receive/transmit simultaneously and the number of UE supported within one UE group.

Based on this, one embodiment of the present invention proposes to use antenna combining scheme to increase the number of UEs supported within one UE group.

Figure 10:
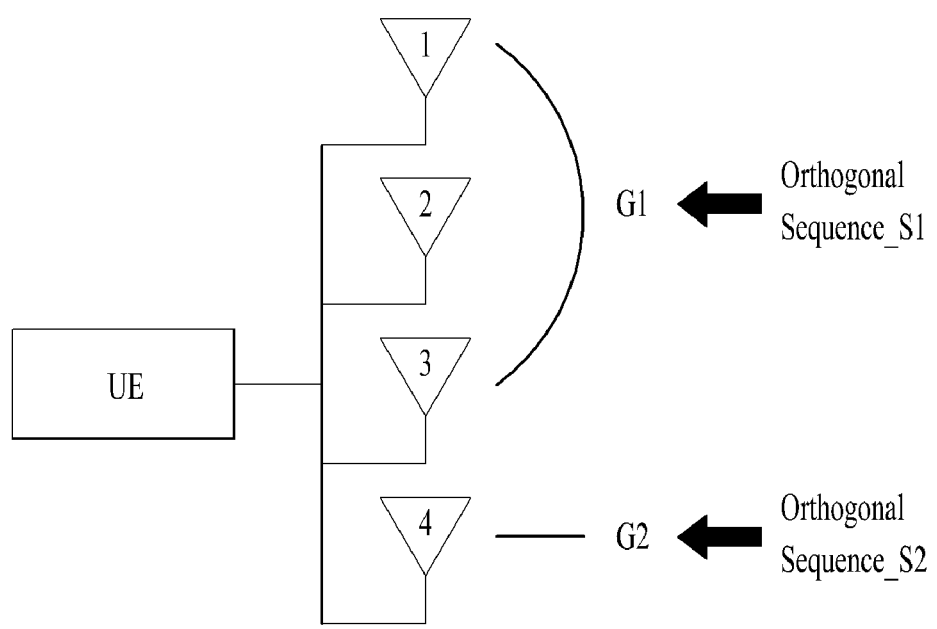
FIG. 10 shows antenna combining scheme according to one embodiment of the present invention.

FIG. 10 shows antenna combining scheme according to one embodiment of the present invention.

In this embodiment, the number of sequences allocated to each UE is less than the number of antennas of each UE. But, to mitigate the performance degradation, the antennas of each UE are combined for transmitting the pilots. Signals other than the pilots can be transmitted via each of the multiple antennas. So, the network can meet the requirement of the channel capacity and can support more number of UEs within one UE group.

In an example shown in FIG. 10, the UE has 4 antennas. The UE of this example receives antenna combining information from the base station. In this example, suppose the antenna combining information combines antennas 1, 2 and 3 into group 1 (G1) and antenna 4 as group 2 (G2). The base station of this example allocates each of orthogonal sequences to each of the antenna groups. So, orthogonal sequence S1 is allocated to antenna group 1 (G1) and orthogonal sequence S2 is allocated to antenna group 2 (G2).

The UE of this example may transmit pilot signals using the allocated orthogonal sequences for each of the antenna groups. So, the UE transmits pilot using S1 via antenna group 1 (G1) and transmits pilot using S2 via antenna group 2. The base station may determine this antenna combining information based on the pilot signals transmitted by each of the antennas of the UE not grouped. Also, the UE may inform the network of the preferred antenna combining for transmitting SRS.

Here, 'antenna combining' may mean establishing logical antennas based on multiple physical/logical antennas. For example, when a UE has 4 physical antennas, 2 antenna groups can be defined as:

$$[h_1 \; h_2 \; h_3 \; h_4] \to [g_1 \; g_2]$$  [Equation 5]

$$g_1 = \sum_{m=1}^{2} w_m h_m, \quad g_2 = \sum_{m=3}^{4} w_m h_m$$

Here, $h_m$ represents the channel between $m^{th}$ physical channel of the UE and the base station. $g_m$ represents the logical channel between $m^{th}$ logical channel of the UE and the base station. $w_m$ represents weight value for $h_m$, and it can be determined by the base station. Signaling to inform the UE of the $h_m$ may be required. Or, it may be predetermined. The above $g_m$ may be called as 'effective channel' comparing to the physical channel of $h_m$.

According to one embodiment of the present invention, each effective channel can have any number of physical antennas. For example, $g_1$ and $g_2$ may correspond to $\{h_1, h_2, h_4\}$ and $\{h_3\}$, respectively.

The UE of this example may transmit pilot based on the above antenna combining. The base station may estimate channel based on the received pilot. It should be noted that the base station of this example can estimate not only the uplink channel, but also downlink channel when the above explained TDD scheme is used.

The above example can be explained with more details.

Suppose that the UE has 4 antennas. The base station may transmits antenna combining information to the UE combining the 4 antennas into 2 antenna groups with 2 sequences ($t_1$ and $t_2$) and weight vector of [$w_1$ $w_2$ $w_3$ $w_4$]. The UE of this example may transmit pilot with the above sequences and the weight vector. These pilots received at the base station can be represented as following:

$$R = \sum_{m=1}^{2} h_m(w_m t_1^T) + \sum_{m=3}^{4} h_m(w_m t_2^T) + W, \text{ for } R, W \in \Box^{N_B \times \tau}$$ [Equation 6]

$$= \left(\sum_{m=1}^{2} h_m w_m\right) t_1^T + \left(\sum_{m=3}^{4} w_m h_m\right) t_2^T + W$$

$$= g_1 t_1^T + g_2 t_2^T + W$$

In the Equation 6, W represents noise matrix. And, the sequences transmitted via 4 antennas are {$w_1 t_1$ $w_2 t_1$ $w_3 t_2$ $w_4 t_2$}. That is, the UE transmits sequence $t_1$ via antennas 1 and 2, and transmits sequence $t_2$ via antennas 3 and 4. The base station can estimate channels based on the sequences ($t_1$ and $t_2$) as following.

$$\hat{g}_1 = Rt^*_1 = (g_1 t_1^T + g_2 t_2^T + W) t^*_1 = g_1 + W t^*_1$$

$$\hat{g}_2 = Rt^*_2 = (g_1 t_1^T + g_2 t_2^T + W) t^*_2 = g_2 + W t^*_2$$ [Equation 6]

By this, the base station estimates 2 logical (effective) channels instead of 4 physical channels from the UE. By this scheme, the number of orthogonal sequences can be effectively reduced. So, if the channel capacity requirement of the UE can be met by using the logical channels (effective channels) instead of physical channels, the network can support more UEs with limited number of sequences.

In the above examples, the sequences for pilots are supposed as orthogonal sequences. But, in some situation, sequences other than orthogonal sequences can be used for pilot signals (e.g. quasi-orthogonal sequence).

In another example of the present invention, the above antenna grouping can be done with regards to the precoding operation.

In this example, the forms of precoded signals based on the codebook are predetermined by the base station. And, the base station of this example may represent virtual channels closest to the predetermined codebook as linear combination of physical/virtual channels. By doing so, the virtual channels can be found within a less amount of time since they are found based on the predetermined codebook.

Based on it, the base station can transmit indexes and coefficients of physical/virtual channels used for the above linear combination to the UE. Then, the UE may transmit SRS based on the received information. The base station can estimate channels based on the received SRS. Here, when the reference codebooks are orthogonal to each other, the determined virtual channels may be (quasi-)orthogonal to each other. That is, when the base station generate virtual channels similar to the predetermined codebook, the virtual channels may be automatically (quasi-)orthogonal. By doing so, the interference between the virtual channels can be minimized.

In this example, the base station can determine reference codebook set. And, the base station may define new virtual channel based on the reference channels. Here, the newly defined virtual channel can be represented by linear combination of previous physical/virtual channel.

The codebook may represent any vectors or matrixes. The reference codebook used for virtual channels may represent selected at least one reference channel among predetermined codebook.

Here, 'virtual channel' may consist of logical antenna ports instead of physical antennas. So, the virtual channels are defined between the logical antenna ports of the UE and logical antenna ports of the base station, In this example, the above $g_1$ and $g_2$ may correspond to virtual channels, and w may represent coefficients for each of physical/virtual channels.

The procedures to implement the above antenna combining scheme is explained in detail.

Figure 11:
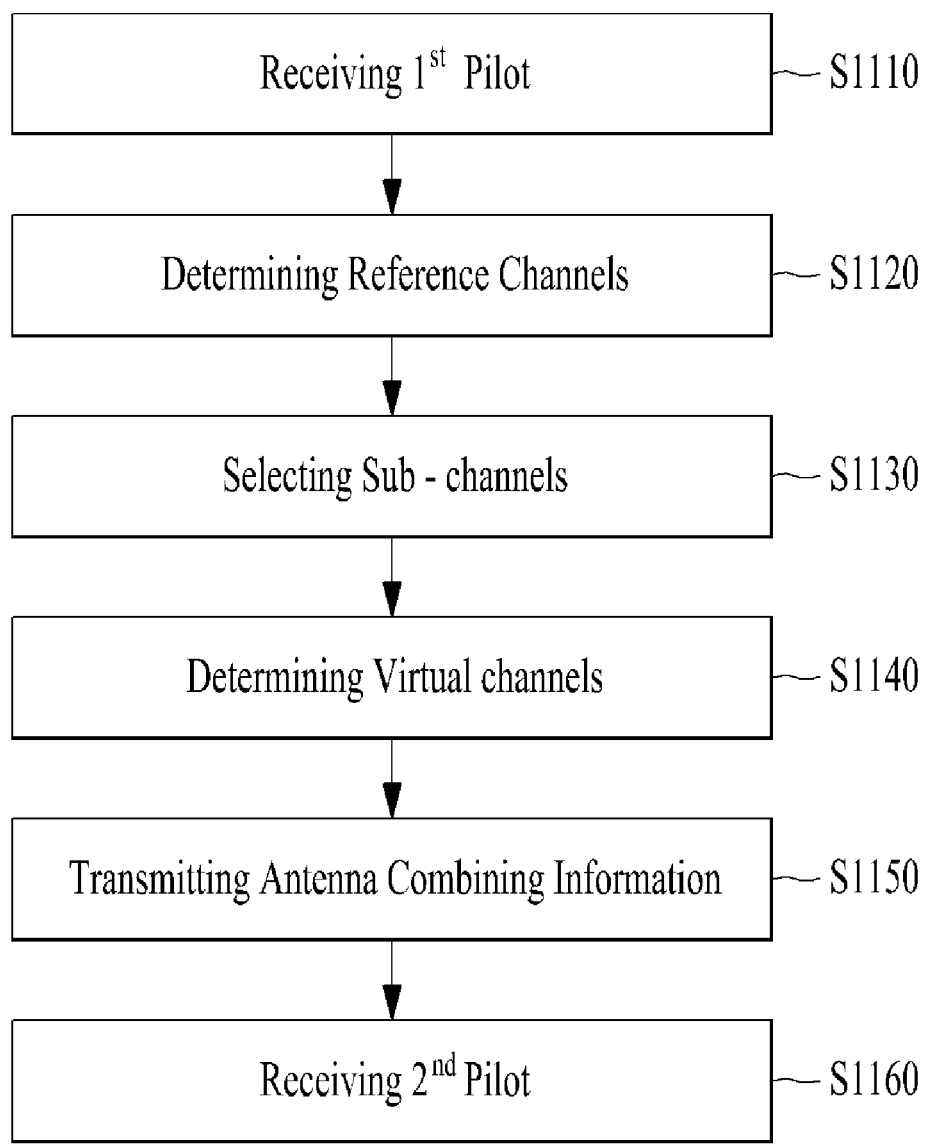
FIG. 11 is a diagram for explaining procedure for antenna combining according to one embodiment of the present invention.

FIG. 11 is a diagram for explaining procedure for antenna combining according to one embodiment of the present invention. FIG. 11 is explained in view of the base station (eNB), but the operation of the UE can be easily understood by the following explanation.

The base station may receive $1^{st}$ pilot signals from a UE via multiple antennas of the UE (S1110). Here, this $1^{st}$ pilot signals are transmitted without antenna combining and are used for the base station to determine the antenna combining information (or, indexes of channels to be combined) of the one embodiment of the present invention.

The $1^{st}$ pilot signals can be transmitted with less power/resource than the $2^{nd}$ pilot signals to reduce interference and save the resource. For this purpose, the $1^{st}$ pilot can be transmitted with longer period, using less resource.

Based on the received $1^{st}$ pilot, the base station may first determine reference channels (S1120). For example, suppose the UE has 4 physical antennas, and the number of virtual channels to be configured is represented as 'M'. When the UE transmits 4 orthogonal sequences via each of 4 physical antennas as $1^{st}$ pilot signals, the base station may estimate physical channels of [$h_1$ $h_2$ $h_3$ $h_4$]. In one example, the base station aligns the channels based on the channel qualities (e.g. reception powers) of each channel as following:

$$[h_1 h_2 h_3 h_4], \|h_1\| \geq \|h_3\| \geq \|h_2\| \geq \|h_4\|$$ [Equation 7]

When M=2, the base station may select $h_1$ and $h_3$ as the reference channels, and they are mapped to reference codebooks $c_i$ and $c_j$, respectively. Here, $h_2$ and $h_4$ become sub-channels.

Then, the first reference codebook is defined by finding codebook closest to the channel having biggest power. Then, the second codebook is defined by finding codebook closest to the channel having $2^{nd}$ biggest power. Total M reference codebooks can be defined as stated above.

Then, the base station may select sub-channels to minimize the distance between the reference codebooks and the virtual channels (S1130). Here, the distance can be a chordal distance. The virtual channel has 1 to 1 relationship with one reference codebook, and there is a distance between them. In this case, the base station may use sub channels to reduce the distance between them. By selecting sub channels, the base station may determine the virtual channels (S1140). In this example, one virtual channel may be represented as linear combination of one reference channel and one or more sub channels. If the reference codebooks are defined as orthogonal and virtual channels are exactly same as the reference codebooks, the virtual channels are also orthogonal to each other.

Sub channels are differently mapped to virtual channels based on the correlation with the reference channels. That is, the sub channel is assigned to virtual channels of the reference codebook having largest correlation with that sub channel. In this example, the reference channel can be represented as reference codebook and sub channel having high correlation with the reference codebook.

In some instance, no sub channel can be assigned to a specific virtual channel. So, in one embodiment of the present invention, at least one sub channel is assigned to each virtual channel. In another embodiment, sub channels may be assigned considering the number of sub channel assigned to each virtual channel.

In one example, sub channel, which can make virtual channels become orthogonal, is selected. In this example, the number of sub channels for each virtual channel can be different from each other.

Based on these, the base station may transmit antenna combining information to the UE (S1150). The antenna combining information may comprise (a) indexes of reference codebook (channel) and sub channel(s) for each virtual channel, and (b) coefficients for each reference/sub channel. The coefficient for each reference/sub channel can be determined based on the following.

$$[w_1 \; w_2]^T = (H_1^H H_1)^{-1} H_1^H c_1, \qquad \text{[Equation 8]}$$
$$[w_3 \; w_4]^T = (H_2^H H_2)^{-1} H_2^H c_2$$
$$\text{where } H_1 = [h_1 h_3], H_2 = [h_2 h_4]$$
$$g_1 = \sum_{m=1}^{2} w_m h_m, \; g_2 = \sum_{m=3}^{4} w_m h_m$$

By Equation 8, the coefficients are determined to minimize the chordal distance $\|g_1 - c_1\|_2^2$ between the virtual channel and the reference codebook. Based on this determination, the base station may inform the UE of indexes of the physical channels and coefficients for them. These signalings can be done via physical downlink control information or via RRC layer control information.

Based on this information, the UE may transmit SRS after precoding the pilot (S1160). These precoded pilots can be referred to as $2^{nd}$ pilot signals.

In the above example, the each base station may have its own reference codebook set. The base station may define the reference codebooks to be closet to orthogonal to each other. When the reference codebooks within a set are orthogonal to each other, pilot contamination can be minimized.

For this purpose, the codebook set can be differently determined based on the cell ID. For example, when there are N codebook sets and cell I requires Ni codebook sets, the first codebook for the cell i can be determined based on the cell ID of cell i.

Figure 12:
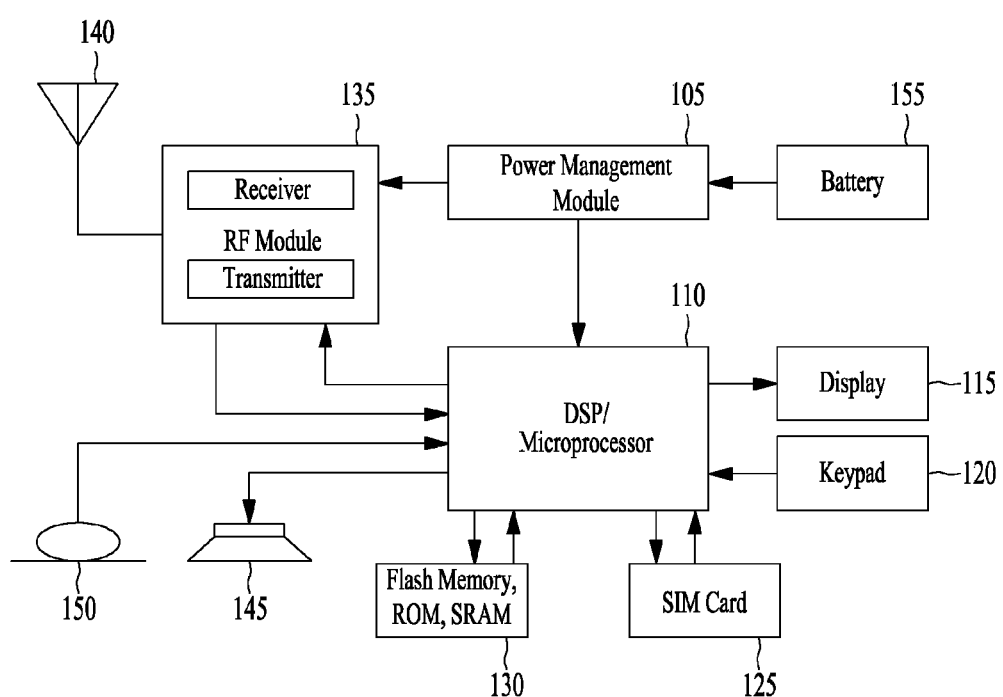
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a base station to operate in a wireless communication system employing a massive MIMO (Multiple Input Multiple Output) scheme, the method comprising:
    receiving first pilot signals transmitted via each of multiple antennas of a user equipment (UE);
    determining one or more virtual channels, wherein each of the one or more virtual channels comprises a corresponding reference codebook and one or more sub channels selected for the corresponding reference codebook, wherein the sub-channels are selected to minimize distance between a corresponding virtual channel and the corresponding reference codebook;
    transmitting antenna combining information to the UE, wherein the antenna combining information combines the multiple antennas of the UE into one or more antenna groups corresponding to the one or more virtual channels;
    receiving second pilot signals transmitted by the UE based on the antenna combining information;
    estimating distance between the one or more virtual channels based on the received second pilot signals; and
    transmitting a request message to the UE requesting to retransmit the first pilot signals when a correlation value becomes larger than a threshold value.

2. The method of claim 1, wherein each of orthogonal sequences for the second pilot signals is allocated to each of the one or more antenna groups, and
    wherein the second pilot signals were generated by using the allocated orthogonal sequences for each of one or more the antenna groups.

3. The method of claim 1, further comprising:
    selecting one or more reference channels based on reception power of each of the one or more reference channels from each of the multiple antennas; and
    selecting a reference codebook, from among the corresponding one or more reference codebooks, that is closest to each of the one or more reference channels.

4. The method of claim 1, further comprising:
    transmitting modified antenna combining information to the UE determined based on the retransmitted first pilot signals.

5. The method of claim 1, further comprising:
    estimating downlink channel from the base station to the UE based on the received second pilot signals.

6. The method of claim 1, wherein the UE is within a first UE group, and
    wherein the base station receives the second pilot signals from the UE at different time periods other than time periods where the base station receives the second pilot signals from a UE of a second UE group.

7. The method of claim 1, wherein the base station comprises multiple antennas, wherein a number of the multiple antennas of the base station is greater than a threshold number.

* * * * *